US011449144B2

(12) United States Patent
Nakamura

(10) Patent No.: US 11,449,144 B2
(45) Date of Patent: Sep. 20, 2022

(54) OPERATION DEVICE

(71) Applicant: NIPPON SEIKI CO., LTD., Niigata (JP)

(72) Inventor: Shuta Nakamura, Niigata (JP)

(73) Assignee: NIPPON SEIKI CO., LTD., Niigata (JP)

(*) Notice: Subject to any disclaimer, the term of this patent is extended or adjusted under 35 U.S.C. 154(b) by 0 days.

(21) Appl. No.: 17/274,640

(22) PCT Filed: Oct. 2, 2019

(86) PCT No.: PCT/JP2019/038877
§ 371 (c)(1),
(2) Date: Mar. 9, 2021

(87) PCT Pub. No.: WO2020/071412
PCT Pub. Date: Apr. 9, 2020

(65) Prior Publication Data
US 2021/0342006 A1 Nov. 4, 2021

(30) Foreign Application Priority Data

Oct. 4, 2018 (JP) .............................. JP2018-188930
Jun. 6, 2019 (JP) .............................. JP2019-106522

(51) Int. Cl.
*G06F 3/01* (2006.01)
*B06B 1/04* (2006.01)
(Continued)

(52) U.S. Cl.
CPC .............. *G06F 3/016* (2013.01); *B06B 1/045* (2013.01); *B06B 1/0681* (2013.01); *G06F 3/041* (2013.01)

(58) Field of Classification Search
CPC ......... G06F 3/016; G06F 3/041; B06B 1/045; B06B 1/0681
See application file for complete search history.

(56) References Cited

U.S. PATENT DOCUMENTS

2002/0149561 A1* 10/2002 Fukumoto .......... G01C 21/3664
345/156
2011/0102342 A1* 5/2011 Iwawaki ............... G06F 1/1626
345/173
(Continued)

FOREIGN PATENT DOCUMENTS

JP 2001-056748 A 2/2001
JP 2002-149312 A 5/2002
(Continued)

OTHER PUBLICATIONS

International Search Report issued in corresponding International Patent Application No. PCT/JP2019/038877, dated Dec. 3, 2019, with English translation.
(Continued)

*Primary Examiner* — Quan Zhen Wang
*Assistant Examiner* — Mancil Littlejohn, Jr.
(74) *Attorney, Agent, or Firm* — McDermott Will & Emery LLP

(57) ABSTRACT

The present invention provides an operation device which is capable of efficiently transmitting vibrations. An operation device according to the present invention is provided with: a first structure that comprises a touch panel module, a first case in which the touch panel module is arranged, a first supporting body to which the first case is affixed, and a vibration actuator 10 which is arranged on the first supporting body; a second structure that comprises a second supporting body, which is connected to the first supporting body, a second case which is affixed to the second supporting body, and a circuit board which is arranged in the second case; and a vibration damping member that connects the first supporting body and the second supporting body to each other.

15 Claims, 13 Drawing Sheets

(51) Int. Cl.
*B06B 1/06* (2006.01)
*G06F 3/041* (2006.01)

(56) References Cited

U.S. PATENT DOCUMENTS

| | | |
|---|---|---|
| 2013/0229088 A1 | 9/2013 | Jung et al. |
| 2013/0321321 A1* | 12/2013 | Hiraoka ................ H04R 7/045 345/173 |
| 2015/0145783 A1* | 5/2015 | Redelsheimer ....... G06F 1/1643 345/173 |
| 2019/0339780 A1 | 11/2019 | Nagasaki et al. |

FOREIGN PATENT DOCUMENTS

| | | |
|---|---|---|
| JP | 2011-107766 A | 6/2011 |
| JP | 2015-103255 A | 6/2015 |
| JP | 2018-079434 A | 5/2018 |
| WO | 2018/143035 A1 | 8/2018 |

OTHER PUBLICATIONS

The Extended European Search Report issued in corresponding EP Application No. 19869255.0, dated May 10, 2022.

* cited by examiner

BACK ←→ FRONT

OPERATION DEVICE

CROSS REFERENCE

This application is the U.S. National Phase under 35 U.S.C. § 371 of International Application No. PCT/JP2019/038877, filed on Oct. 2, 2019, which claims the benefit of Japanese Application No. 2018-188930, filed on Oct. 4, 2018, and Japanese Application No. 2019-106522, filed on Jun. 6, 2019, the entire contents of each are hereby incorporated by reference.

TECHNICAL FIELD

The present disclosure relates to an operation device, and particularly relates to an operation device having a haptic function.

BACKGROUND ART

In recent years, it has been practiced to add a haptic (tactile feedback) function to a user interface such as a touch panel (see, for example, Patent Document 1). As a method of adding a haptic function to a user interface, there is known a method in which a vibration actuator is installed in the user interface, and the vibration actuator is driven accompanied by a user's operation to transmit vibrations to the user interface (see, for example, Patent Document 2). FIG. 8 shows one example of a linear vibration actuator among vibration actuators. A linear vibration actuator 10 is provided with a magnet 13 through which a shaft 12 passes within a thin rectangular parallelepiped case 11. Springs 14 and 15 are respectively provided at left and right ends of the shaft 12 to movably hold the magnet 13 substantially at the center of the shaft 12. A coil 16 is fixed to face the magnet 13 within the case 11. By applying alternating current to the coil 16, the magnet 13 serving as a weight linearly reciprocates back and forth in the longitudinal direction of the case 11 along the shaft 12 to vibrate the case 11.

PRIOR ART DOCUMENT

Patent Document

Patent Document 1: Japanese Unexamined Patent Application Publication No. 2015-103255
Patent Document 2: Japanese Unexamined Patent Application Publication No. 2018-79434

SUMMARY OF THE INVENTION

Problems to be Solved by the Invention

However, there was room for improvement in terms of efficiently transmitting vibrations in the operation device provided with the haptic function.

In view of the above-described problems, an object of the present disclosure is to provide an operation device capable of efficiently transmitting vibrations.

Solution to Problem

An operation device according to a first disclosure is an operation device for operating operation target equipment (200) including:
a first structure (110) including a touch panel module (111) having a touch panel (20) that detects an operation position of an operator and a display panel (30), a first case (112) in which the touch panel module (111) is disposed, a first supporting body (113) to which the first case (112) is fixed, and a vibration actuator (10) disposed on the first supporting body (113);
a second structure (120) including a second supporting body (121) to be connected to the first supporting body (113), a second case (122) to be fixed to the second supporting body (121), and a circuit board (123) disposed in the second supporting body (121) or the second case (122); and
a vibration damping member (130) that connects the first supporting body (113) and the second supporting body (121).

The operation device according to a second disclosure is the operation device described in the first disclosure, wherein the first case (112) is a frame body surrounding a peripheral edge of the touch panel module (111).

The operation device according to a third disclosure is the operation device described in the first disclosure, wherein the first supporting body (113) has a higher rigidity than the first case (112).

The operation device according to a fourth disclosure is the operation device described in the first disclosure, further including a non-vibration damping member (140) that connects the first supporting body (113) and the second supporting body (121), in place of the vibration damping member (130).

The operation device according to a fifth disclosure is the operation device described in the first disclosure, further including a fixing member (S5) that fixes the vibration damping member (130) to the first supporting body (113), and a non-circular washer (W11) provided between the vibration damping member (130) and the fixing member (S5), wherein a part of an outer edge portion (W11b) of the washer (W11) overlaps a back surface of the second case (122) at a distance (P1).

The operation device according to a sixth disclosure is the operation device according to the first disclosure, further including a cushion member (150) located between the first case (112) and the second case (122) along a plane direction of the touch panel module (111).

The operation device according to a seventh disclosure is the operation device described in the first disclosure, further including a conductive member (160) that comes into contact with the first supporting body (113) and the second supporting body (121), wherein the conductive member (160) has a bent portion (161) bent in the thickness direction of the operation device.

The operation device according to an eighth disclosure is the operation device described in the first disclosure, wherein the vibration damping member (130) is disposed on the first supporting body (113) to be compressed by a load applied to the touch panel module (111) when the operation device is installed in the operation target equipment (200).

Effect of the Invention

According to the present disclosure, it becomes possible to efficiently transmit vibrations. Some of the other advantageous effects of the present disclosure are described later.

MODE FOR CARRYING OUT THE INVENTION

In the following, as an embodiment of an operation device according to the present disclosure, an embodiment applied to an operation device for a multifunction device is described as an example with reference to the drawings.

Figure 1:
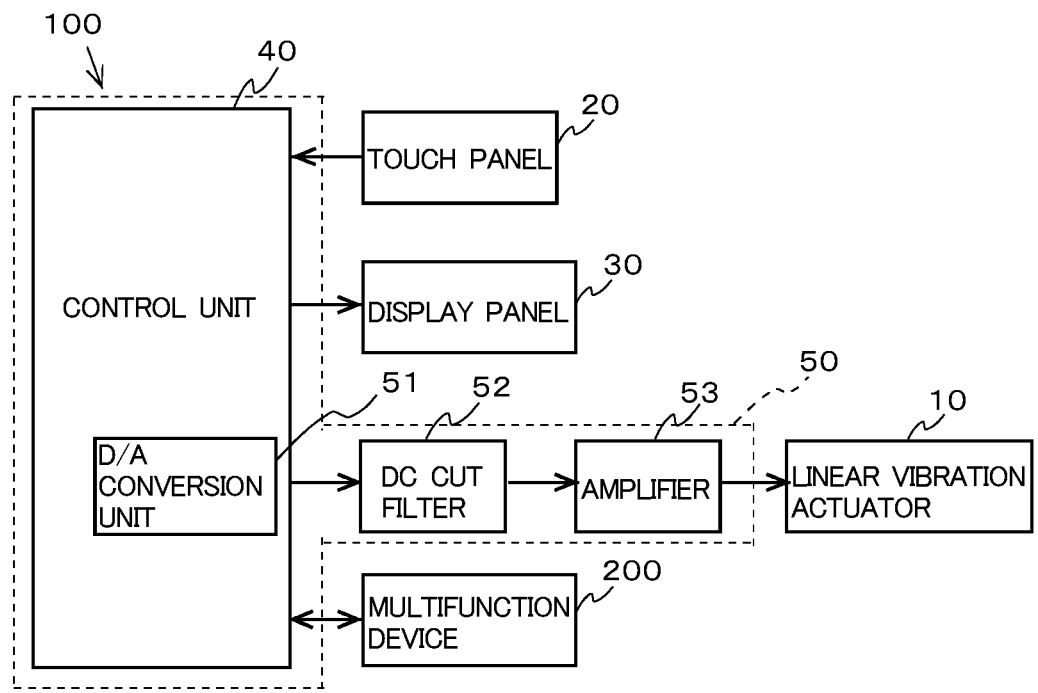
FIG. 1 is a block diagram of an operation device according to an embodiment of the present disclosure.

FIG. 1 is a block diagram showing functions of an operation device 100. As shown in FIG. 1, the operation device 100 has, as functions thereof, a linear vibration actuator 10, a touch panel 20, a display panel 30, a control unit 40, a digital/analog (D/A) conversion unit 51, a DC cut filter 52, and an amplifier 53. In addition, the operation device 100 is wiredly or wirelessly connected to be communicable with a multifunction device (operation target equipment) 200 serving as an operation target. Among the functions of the operation device 100, the control unit 40, the D/A conversion unit 51, the DC cut filter 52, and the amplifier 53 function as a driving device 50 of a vibration actuator, and drive the linear vibration actuator 10.

Figure 8:
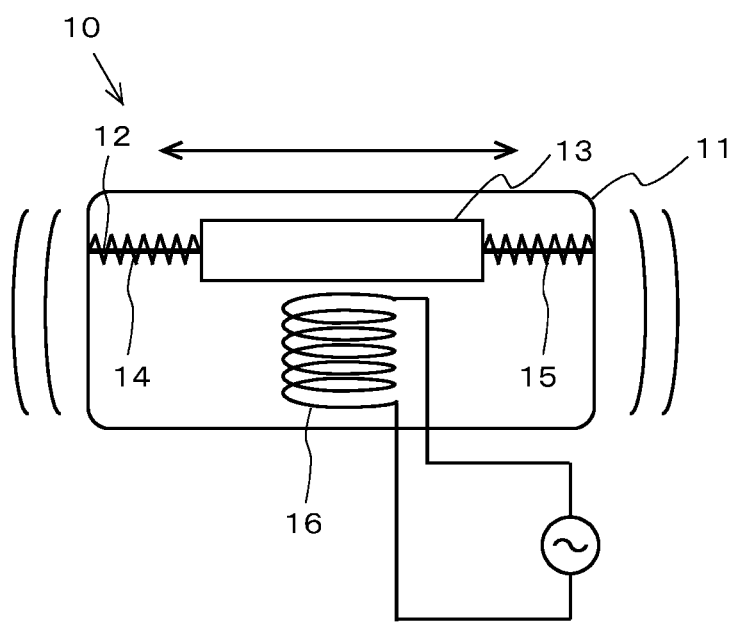
FIG. 8 is a diagram showing one example of a linear vibration actuator.

As shown in FIG. 8, the linear vibration actuator 10 is provided with a magnet 13 through which a shaft 12 passes within a thin rectangular parallelepiped case 11. Springs 14 and 15 are respectively provided at left and right ends of the shaft 12 to movably hold the magnet 13 substantially at the center of the shaft 12. A coil 16 is fixed to face the magnet 13 within the case 11. By applying alternating current to the coil 16, the magnet 13 serving as a weight linearly reciprocates back and forth in the longitudinal direction of the case 11 along the shaft 12 to vibrate the case 11. The vibration actuator according to the present disclosure is not limited to the linear vibration actuator 10, and may be, for example, a piezoelectric actuator using a piezoelectric element. In addition, one example is described regarding a structure of the linear vibration actuator 10, and a linear vibration actuator having a different structure or the like may be used.

As the touch panel 20, a known touch panel that detects an operation position (position of a finger, a pen, and the like) of the user (operator) may be used as necessary. In this case, the touch panel 20 is disposed to cover a front surface of the display panel 30. The touch panel 20 transmits, to the control unit 40, a detection result (coordinate information) of the user's operation position, as an operation signal. In the touch panel 20, a tactile sensation is fed back to the user by transmitting vibrations of the linear vibration actuator 10 to the touch panel 20 via a vibration transmission path to be described later. The touch panel 20 is fixed to the display panel 30 by adhesion or the like, and constitutes a touch panel module to be described later together with the display panel 30.

The display panel 30 displays various pieces of information under the control of the control unit 40, and known indicators such as a liquid crystal display panel and an organic EL display panel can be applied as necessary. In particular, in the present embodiment, an operation menu image for the user to operate the multifunction device 200 is displayed.

The control unit 40 controls the display panel 30 and the D/A conversion unit 51, based on a detection result (operation signal) from the touch panel 20, and outputs an equipment control signal for causing the multifunction device 200 to perform a predetermined operation. More specifically, the control unit 40 causes the display panel 30 to display predetermined information, and causes the D/A conversion unit 51 to output an analog signal to be described later. For example, a microcomputer computer including a calculation circuit, a storage circuit, a timekeeping circuit, and the like is applied as the control unit 40. Further, in the present embodiment, the control unit 40 includes the D/A conversion unit 51 as its function.

The D/A conversion unit 51 is a circuit that converts a digital signal from the control unit 40 into an analog signal and outputs the analog signal, and is incorporated in the control unit 40 in the present embodiment. The D/A conversion unit 51 outputs, for example, a positive analog voltage of 0 to 5 [V], as an analog signal. The D/A conversion unit 51 may be provided independently of the control unit 40. In order to drive the linear vibration actuator 10, an analog signal contains a DC component and an AC component, and shows a predetermined waveform such as a sine wave.

The DC cut filter 52 is a differentiating circuit that inputs an analog signal to be output from the D/A conversion unit 51, cuts off a DC component of the analog signal, and outputs (passes) an AC component of the analog signal. For example, a capacitor can be applied as the DC cut filter 52.

The amplifier 53 is an amplifier circuit that inputs an AC component of an analog signal to be output from the DC cut filter 52, amplifies the AC component, and outputs the amplified AC component to the linear vibration actuator 10.

Figure 2:
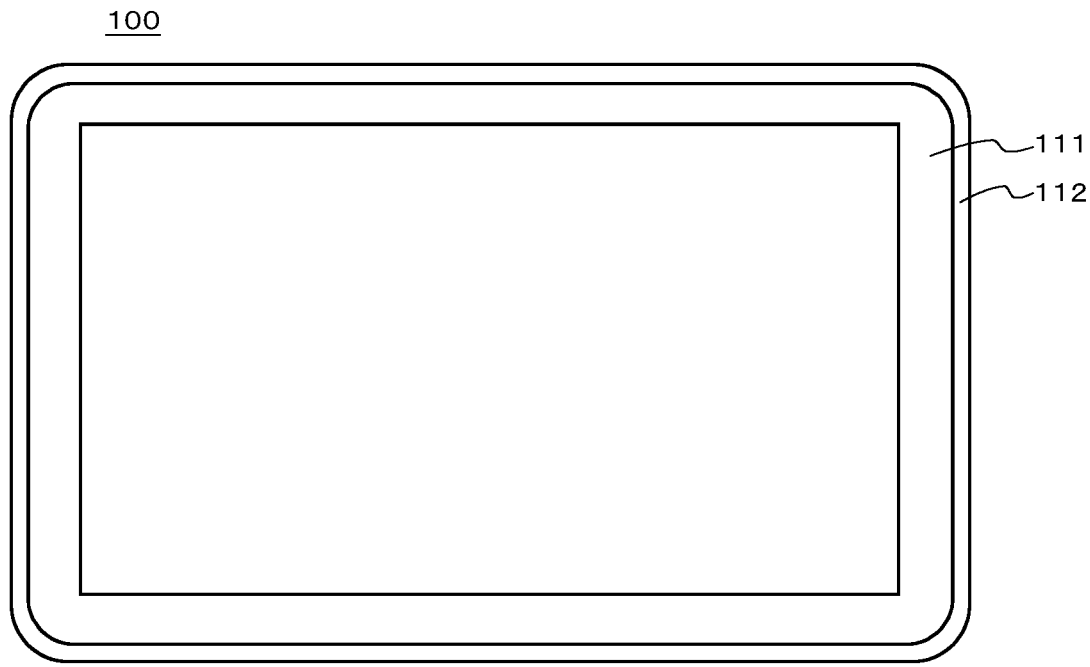
FIG. 2 is a plan view of the above-described operation device.
Figure 3:
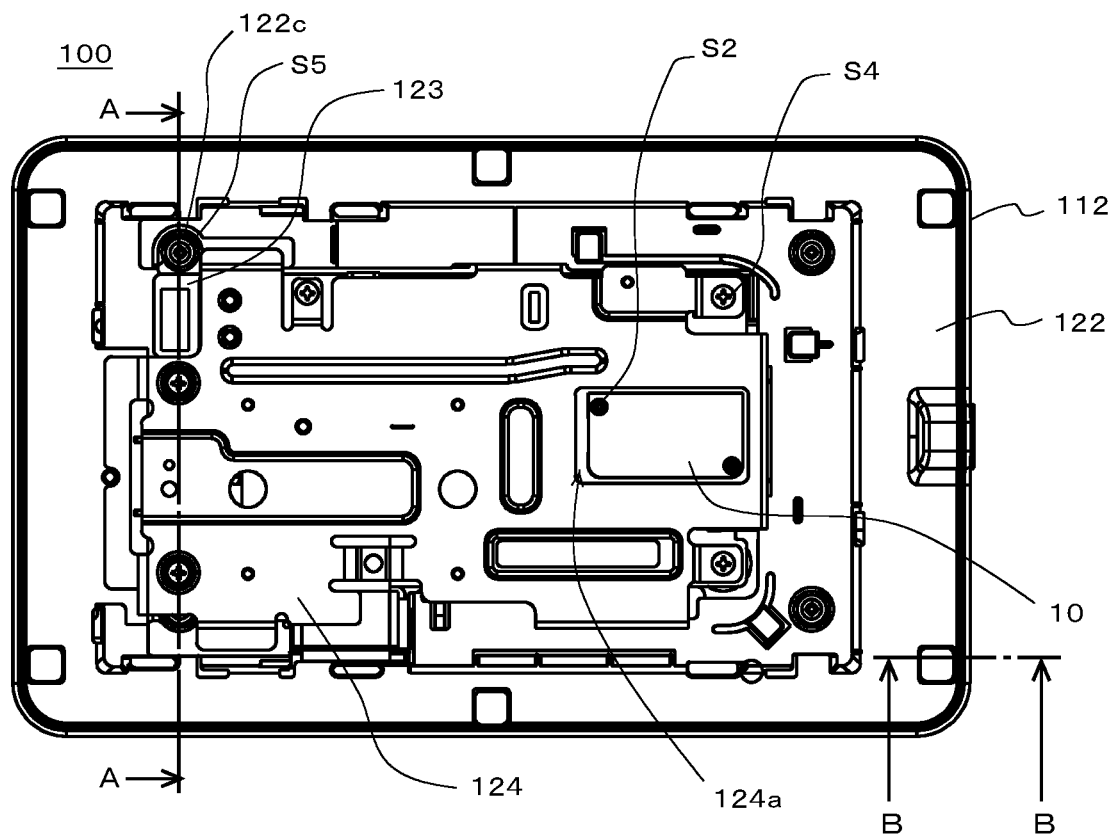
FIG. 3 is a rear view of the operation device shown in FIG. 2.
Figure 4:
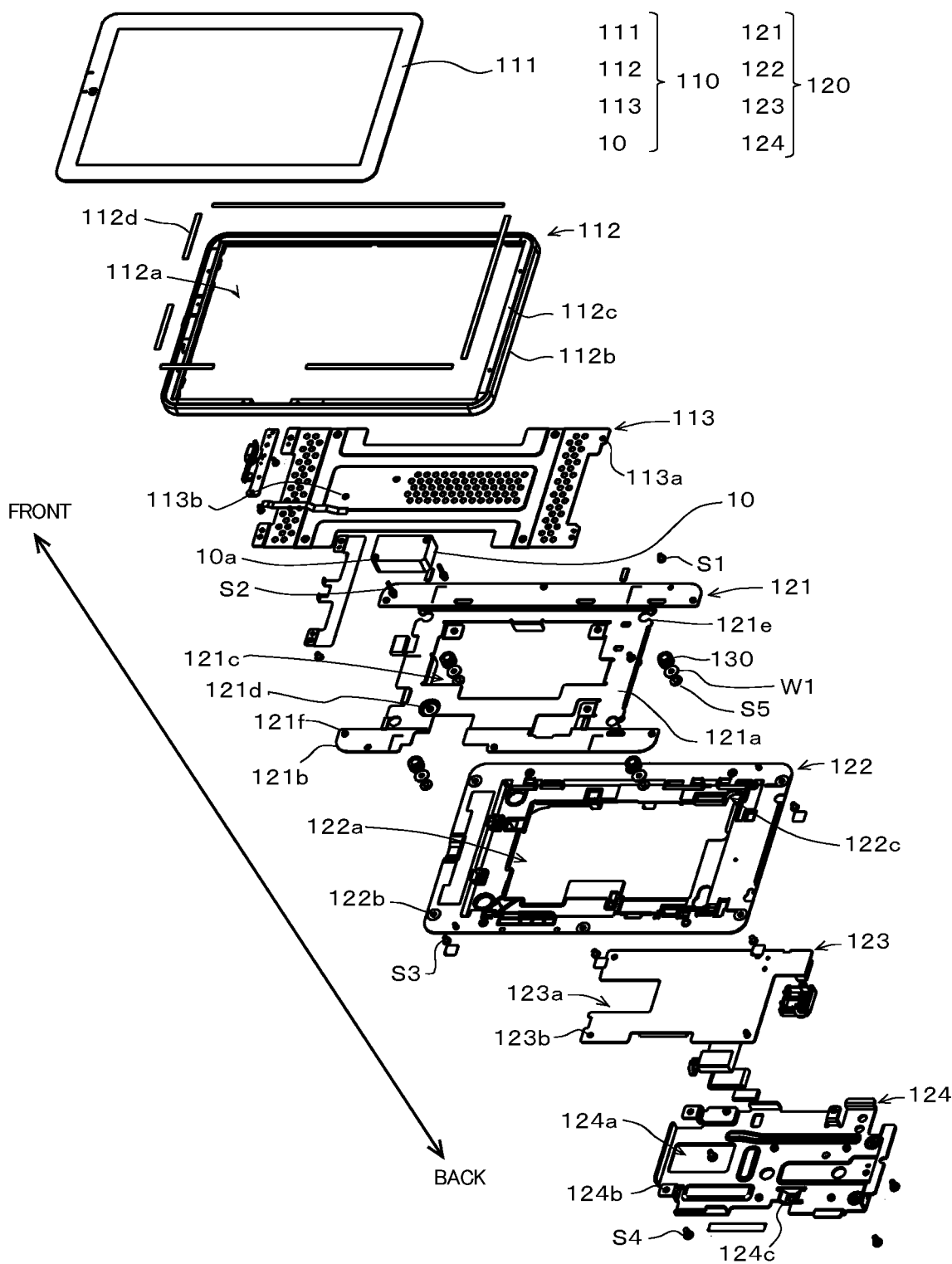
FIG. 4 is an exploded perspective view of the operation device shown in FIG. 2.
Figure 5:
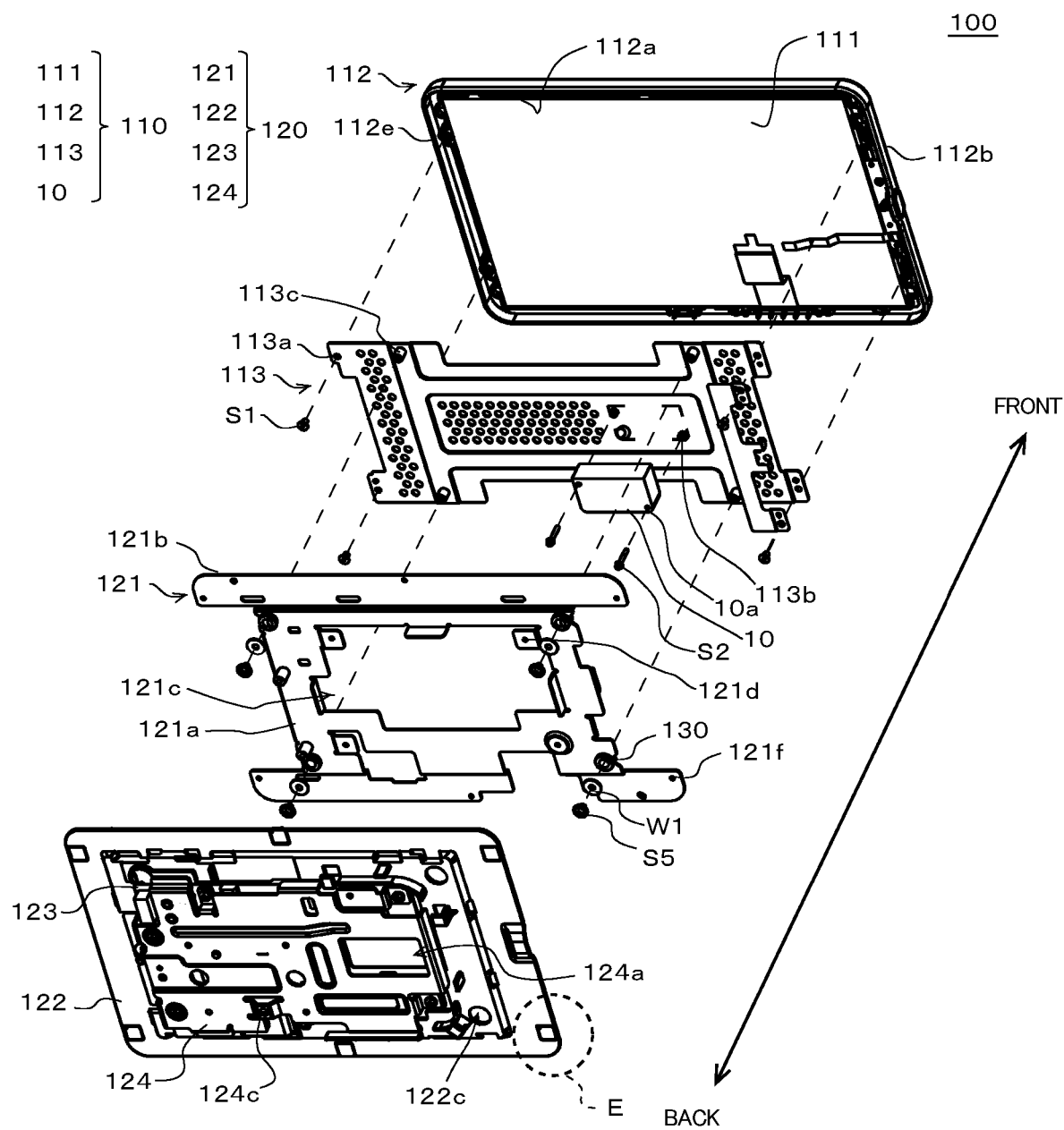
FIG. 5 is an exploded perspective view of the operation device shown in FIG. 2.
Figure 6:
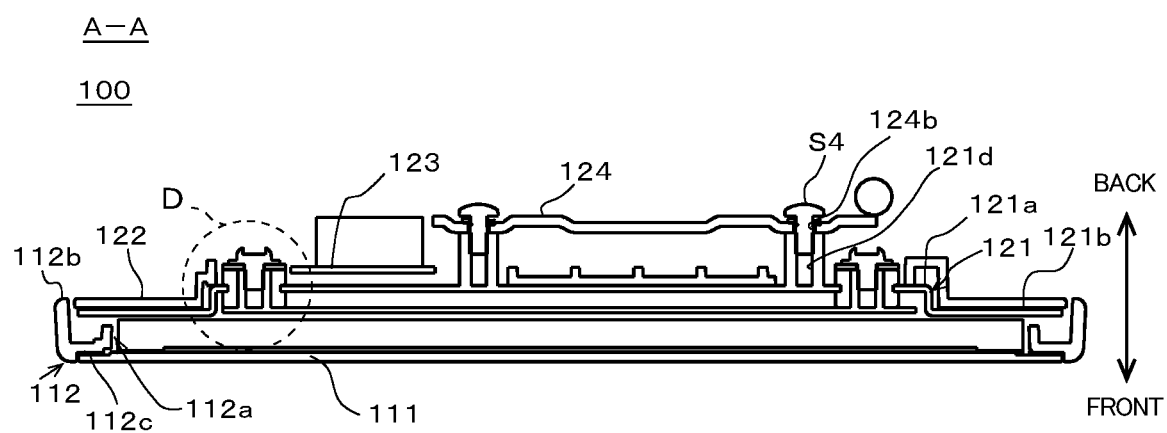
FIG. 6 is a cross-sectional view taken along the line A-A in FIG. 3.
Figure 7:
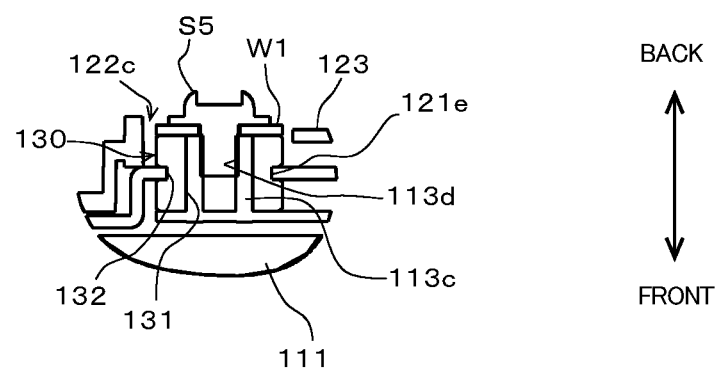
FIG. 7 is an enlarged view of an area D in FIG. 6.

Next, a structure of the operation device 100 is described with reference to FIGS. 2 to 7. FIG. 2 is a plan view of the operation device 100. FIG. 3 is a rear view of the operation device 100. FIG. 4 is an exploded perspective view of the operation device 100 when viewed from the front side. FIG. 5 is an exploded perspective view of the operation device 100 when viewed from the back side. FIG. 6 is a cross-sectional view taken along the line A-A in FIG. 3. FIG. 7 is an enlarged view of an area D in FIG. 6. In FIGS. 6 and 7, a hatching indicating a cross section is omitted to make it easy to see the drawings.

FIGS. 2 to 7 are referred to as necessary. The operation device 100 includes a first structure 110, a second structure 120, and a damper rubber (vibration damping member) 130.

The first structure 110 has a touch panel module 111, a first case 112, a first supporting body 113, and the linear vibration actuator 10. Note that FIG. 5 shows a state that the touch panel module 111 is disposed in the first case 112.

As described above, the touch panel module 111 is a flat plate-like member in which the touch panel 20 and the display panel 30 are integrally formed by adhesion or the like. The touch panel module 111 is located on the most front side of the operation device 100, and constitutes an operation surface (see FIG. 2). In the touch panel module 111, the touch panel 20 is located on the front side, and the display panel 30 is located on the back side. The touch panel module 111 may also include a case that covers the back side of the display panel 30.

The first case 112 is a frame body surrounding a peripheral edge of the touch panel module 111, and serves as an exterior member on the front side of the operation device 100. The first case 112 is made of, for example, a resin material. The first case 112 has a substantially rectangular shape as a whole when viewed from the front side, and includes an opening 112a facing a middle portion of the touch panel module 111 and a peripheral wall portion 112b surrounding the opening 112a. A flat placement portion 112c on which the peripheral edge of the touch panel module 111 is placed is formed on the front side of the peripheral wall portion 112b. The placement portion 112c of the first case 112, and the peripheral edge of the touch panel module 111 are fixed to each other via an adhesive tape 112d. In addition, a screw hole 112e is formed at a plurality of positions (four positions in the present embodiment) in a back surface of the peripheral wall portion 112b.

The first supporting body 113 is a supporting body that fixes the first case 112. The first supporting body 113 is made of, for example, a metal material such as iron, and it is desirable to use a material having a higher rigidity than the first case 112. The first supporting body 113 is located behind the first case 112. The first supporting body 113 is formed into a substantially H-shape when viewed from the front side, and has a through-hole 113a at a plurality of positions associated with the screw holes 112e of the first case 112. The first case 112 is fixed to the first supporting body 113 by tightening a screw S1 passing through the through-hole 113a into the screw hole 112e. In addition, the linear vibration actuator 10 is disposed behind the first supporting body 113. The first supporting body 113 is formed with a screw hole 113b at a plurality of positions in association with a position where the linear vibration actuator 10 is disposed. The linear vibration actuator 10 is fixed to the first supporting body 113 by tightening a screw S2 passing through a through-hole 10a formed in the linear vibration actuator 10 into the screw hole 113b. Further, a cylindrical portion 113c to be received into a through-hole 131 of the damper rubber 130 to be described later is formed at a plurality of positions (four positions in the present embodiment) on a back surface of the first supporting body 113. A hole portion of the cylindrical portion 113c serves as a screw hole 113d (see FIG. 7).

The second structure 120 has a second supporting body 121, a second case 122, a circuit board 123, and a third supporting body 124. Note that FIG. 5 shows a state that the circuit board 123 and the third supporting body 124 are disposed in the second case 122.

The second supporting body 121 is a supporting body that fixes the second case 122. The second supporting body 121 is made of, for example, a metal material such as iron. The second supporting body 121 is located behind the first supporting body 113. The second supporting body 121 includes a rectangular base portion 121a, and upper and lower long plate portions 121b that are respectively connected to upper and lower ends of the base portion 121a and extend along the longitudinal direction of the touch panel module 111. An opening 121c facing a middle portion of the first supporting body 113 including the linear vibration actuator 10 is formed in the middle of the base portion 121a. In addition, a screw hole 121d is formed at a plurality of positions in the base portion 121a. Further, a cutout portion 121e for receiving a groove portion of the damper rubber 130 to be described later is formed at a plurality of positions (four positions in the present embodiment) in an outer peripheral portion of the base portion 121a. A plurality of screw holes 121f are formed in the long plate portion 121b.

The second case 122 constitutes a pair with the first case 112, and serves as an exterior member behind the operation device 100. The second case 122 is made of, for example, a resin material. The second case 122 is located behind the second supporting body 121. The second case 122 has, as an outer shape, a substantially rectangular shape according to the outer shape of the first case 112, and has an opening 122a facing the base portion 121a of the second supporting body 121. Thus, the second case 122 faces the screw hole 121d of the second supporting body 121 through the opening 122a when viewed from the back side. In addition, a through-hole 122b is formed at a plurality of positions in a peripheral portion of the second case 122 in association with the screw holes 121f of the long plate portion 121b of the second supporting body 121. The second case 122 is fixed to the second supporting body 121 by tightening a screw S3 passing through the through-hole 122b into the screw hole 121f of the second supporting body 121. In addition, a through-hole 122c associated with the damper rubber 130 to be described later is formed at a plurality of positions in the second case 122.

The circuit board 123 is a member on which electronic components and electronic circuits constituting the control unit 40 are mounted. The circuit board 123 is constituted of a hard circuit board, for example. The circuit board 123 is electrically connected to the touch panel module 111 (the touch panel 20 and the display panel 30), and the linear vibration actuator 10 via a connecting member such as a flexible board and a cable. The circuit board 123 is located behind the second case 122, and is disposed around the opening 122a of the second case 122. The circuit board 123 may be directly disposed on the second supporting body 121 without intervening the second case 122. The circuit board 123 has a flat plate shape, and a cutout portion 123a is formed in a position facing the linear vibration actuator 10. Further, a through-hole 123b is formed in the circuit board 123 at a plurality of positions in association with the screw holes 121d of the base portion 121a of the second supporting body 121.

The third supporting body 124 is a member that connects the multifunction device 200, which is operation target equipment, and the operation device 100. The third supporting body 124 is made of, for example, a metal material such as iron. The third supporting body 124 is disposed behind the circuit board 123 (see FIG. 3). The operation device 100 may further include a back cover (not shown) behind the third supporting body 124. The third supporting body 124 has an outer shape substantially according to the shape of the opening 122a of the second case 122, and has an opening 124a in a position facing the linear vibration actuator 10. Thus, the linear vibration actuator 10 is exposed from a back surface of the third supporting body 124. Further, a through-hole 124b is formed in the third supporting body 124 at a plurality of positions on a portion associated with the through-hole 123b of the circuit board 123 and on a portion that does not face the circuit board 123. The third supporting body 124 and the circuit board 123 are fixed to the second supporting body 121 by tightening a screw S4 passing through the through-hole 124b and the through-hole 123b, or passing through the through-hole 124b into the screw hole 121d of the second supporting body 121. In addition, the third supporting body 124 has a screw hole 124c through which the third supporting body 124 is connected to the multifunction device 200. In addition, an uneven portion is formed on the third supporting body 124 as necessary in order to avoid contact with electronic components to be mounted on the circuit board 123, and the like.

The damper rubber 130 is one example of a vibration damping member according to the present disclosure, and is composed of a structure and/or a material capable of absorbing vibrations. The damper rubber 130 is cylindrical, and has the through-hole 131 inside thereof, and a groove portion 132 in an outer surface thereof (see FIG. 7). When the operation device 100 is assembled, first, the groove portion 132 of the damper rubber 130 is fitted into the cutout portion 121e of the second supporting body 121 (see FIG. 5). Thereafter, the cylindrical portion 113c of the first supporting body 113 is inserted into the through-hole 131 of the damper rubber 130, and a screw S5 is tightened into the screw hole 113d of the cylindrical portion 113c via a washer W1 (see FIG. 7). Thus, the first supporting body 113 and the second supporting body 121 are connected via the damper rubber 130. The damper rubber 130, the washer W1, and the screw S5 face through the through-hole 122c of the second case 122 when viewed from the back side (see FIG. 3). In addition, the through-hole 122c is formed to have a larger diameter than the diameters of the damper rubber 130, the washer W1, and the screw S5 so as not to come into contact with the damper rubber 130, the washer W1, and the screw S5. Herein, the first structure 110 and the second structure 120 are not connected to each other except for connection between the first supporting body 113 and the second supporting body 121 by the damper rubber 130. Herein, "connection" in the present disclosure means a state of being connected in such a way as to restrict mutual positional displacement, and does not include a simple contact.

Next, transmission of vibrations by the linear vibration actuator 10 is described. Vibrations generated from the linear vibration actuator 10 are first transmitted to the first supporting body 113 on which the linear vibration actuator 10 is directly disposed, and thereafter, to the first case 112 fixed to the first supporting body 113. Then, the vibrations transmitted to the first case 112 are further transmitted to the touch panel module 111 disposed in the first case 112, and a tactile sensation is fed back to the user. On the other hand, transmission of vibrations from the first supporting body 113 to the second supporting body 121 is suppressed by the damper rubber 130.

The operation device 100 according to the present embodiment is provided with the first structure 110 including the touch panel module 111 having the touch panel 20 that detects a user's operation position and the display panel 30, the first case 112 in which the touch panel module 111 is disposed, the first supporting body 113 to which the first case 112 is fixed, and the linear vibration actuator 10 disposed on the first supporting body 113; the second structure 120 including the second supporting body 121 to be connected to the first supporting body 113, the second case 122 to be fixed to the second supporting body 121, and the circuit board 123 disposed in the second supporting body 121 or the second case 122; and the damper rubber 130 that connects the first supporting body 113 and the second supporting body 121.

According to this configuration, as compared with a case where vibrations are transmitted to the entirety of the operation device 100, it is possible to efficiently transmit vibrations to a necessary portion by limiting a portion of the operation device 100 where vibrations by the linear vibration actuator 10 are transmitted substantially to the first structure 110 on the front side. Further, by disposing the linear vibration actuator 10 on the first supporting body 113 to which the first case 112 is fixed, as compared with a case where the linear vibration actuator 10 is directly disposed on a back surface of the touch panel module 111, the operation device 100 is less likely to be affected by the specifications of the touch panel module 111 (particularly, rigidity of the back surface), and it is possible to efficiently transmit vibrations to the entirety of the first structure 110.

Further, in the operation device 100, the first case 112 is a frame body surrounding a peripheral edge of the touch panel module 111.

According to this configuration, it is possible to efficiently transmit, to the entire circumference of the first structure 110, vibrations transmitted from the linear vibration actuator 10 to the first supporting body 113.

Further, in the operation device 100, the first supporting body 113 has a higher rigidity than the first case 112.

According to this configuration, it is possible to efficiently transmit vibrations from the linear vibration actuator 10 to the first structure 110.

In the following, modifications of the present disclosure are described with reference to the drawings. The same or equivalent components as those in the above-described embodiment are designated by the same reference numerals, and detailed description thereof is omitted.

[First Modification]

A first modification of the present disclosure is described with reference to FIGS. 9 and 10. An operation device 100 according to the present modification may be provided with a resin spacer 140 (see FIGS. 9 and 10) that connects a first supporting body 113 and a second supporting body 121, in place of a damper rubber 130. Specifically, in a case where the operation device 100 is manufactured without adding a haptic function (without providing a linear vibration actuator 10), the first supporting body 113 and the second supporting body 121 may be connected by using the resin spacer 140, in place of the damper rubber 130. Thus, it is possible to easily manufacture both an operation device with a haptic function and an operation device without a haptic function.

Figure 9:
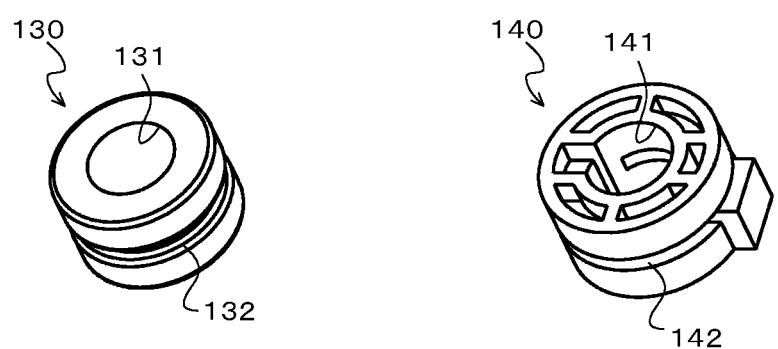
FIG. 9 is a perspective view showing a comparison between a damper rubber and a resin spacer in an operation device according to a first modification of the present disclosure.
Figure 10:
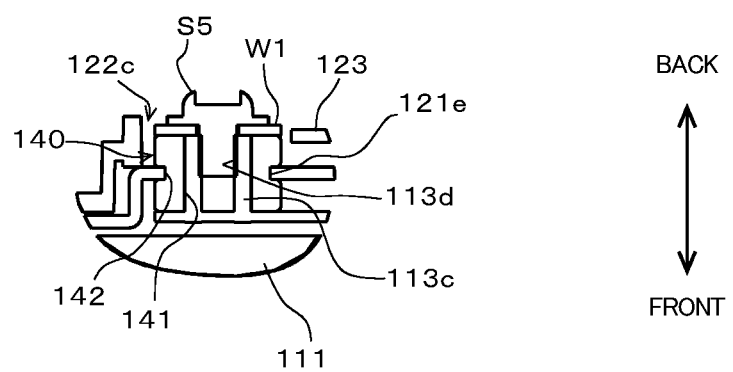
FIG. 10 is a partial cross-sectional view of the above-described operation device.

FIG. 9 is a perspective view showing a comparison between the damper rubber 130 and the resin spacer 140. FIG. 10 is a partial cross-sectional view of the operation device 100 according to the present modification, and corresponds to FIG. 7 of the above-described embodiment. In FIG. 10, a hatching indicating a cross section is omitted to make it easy to see the drawing. FIG. 10 mainly shows a state that the first supporting body 113 and the second supporting body 121 are connected by the resin spacer 140.

The resin spacer 140 is one example of a non-vibration damping member according to the present disclosure, and is composed of a structure and/or a material that does not absorb vibrations or has a lower vibration absorbing function than the damper rubber 130. The resin spacer 140 has a substantially cylindrical shape according to the outer shape of the damper rubber 130, has a through-hole 141 inside thereof, and has a groove portion 142 in an outer surface thereof. In a process of connecting the first supporting body 113 and the second supporting body 121 by the resin spacer 140, in place of the damper rubber 130 in the method of manufacturing the operation device 100 according to the present modification, first, a groove portion 142 of the resin spacer 140 is fitted into a cutout portion 121e of the second supporting body 121. Thereafter, a cylindrical portion 113c of the first supporting body 113 is inserted into the through-hole 141 of the resin spacer 140, and a screw S5 is tightened into a screw hole 113d of the cylindrical portion 113c via a washer W1 (see FIG. 10). Thus, the first supporting body 113 and the second supporting body 121 are connected via the resin spacer 140.

[Second Modification]

A second modification of the present disclosure is described with reference to FIGS. 11 and 12. An operation device 100 according to the present modification includes a screw S5 (one example of a fixing member) that fixes a damper rubber 130 to a first supporting body 113, and a non-circular washer W11 provided between the damper rubber 130 and the screw S5. A part of an outer edge portion W11b of the washer W11 may overlap a back surface of a second case 122 at a distance P1. Thus, it is possible to appropriately keep a distance between a first supporting body 110 and a second supporting body 120 when the first supporting body 110 is pulled, or the like.

Figure 11:
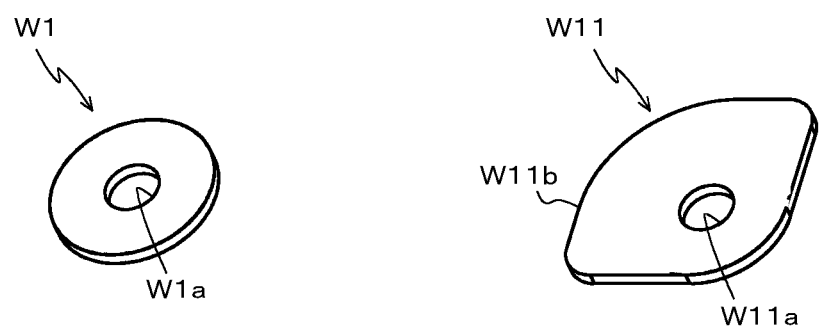
FIG. 11 is a perspective view showing a comparison between a circular washer and a non-circular washer in an operation device according to a second modification of the present disclosure.
Figure 12:
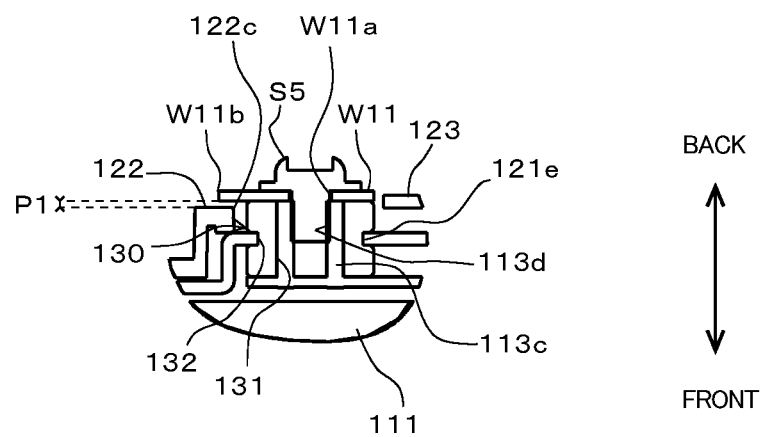
FIG. 12 is a partial cross-sectional view of the above-described operation device.

FIG. 11 is a perspective view showing a comparison between the circular washer W1 and the non-circular washer W11. FIG. 12 is a partial cross-sectional view of the operation device 100 according to the present modification, and corresponds to FIG. 7 of the above-described embodiment. In FIG. 12, a hatching indicating a cross section is omitted to make it easy to see the drawing. FIG. 12 mainly shows overlapping between an outer edge portion W11b of the washer W11 and the back surface of the second case 122.

As shown in FIG. 11, the common washer W1 has a circular shape, and has a through-hole W1a in the center thereof. On the other hand, the non-circular washer W11 according to the present modification has a substantially fan shape, and has a through-hole 11a at a position slightly outwardly displaced from the center thereof. In other words, the washer W11 has a shape such that a distance from the through-hole W11a to the outer edge portion W11b is partially different (not uniform). In fixing the damper rubber 130 to the first supporting body 113, a part of the outer edge portion W11b of the washer W11 (a portion excluding a portion where a distance from the through-hole W11a is smallest) overlaps the back surface of the second case 122 at a distance P1 between the damper rubber 130 and the screw S5. Since the outer edge portion W11b of the washer W11 and the back surface of the second case 122 overlap, the shape (including a height) of the second case 122 and/or other members may be changed as necessary. Further, the distance P1 between the washer W11 and the second case 122 may be desirably smaller than an amount of movement of the first structure 110 (a height in the front and back directions, not shown), which is required for occurrence of a gap in the front and back directions between the first structure 110 (more specifically, a back end portion of a peripheral wall portion 112b of a first case 112, see FIG. 6), and the second case 122 (more specifically, a front surface thereof) when the first structure 110 is pulled to the front side.

[Third Modification]

A third modification of the present disclosure is described with reference to FIGS. 13 and 14. An operation device 100 according to the present modification may include a cushion member 150 located between a first case 112 and a second case 122 along a plane direction of a touch panel module 111. According to this configuration, even when an external force along the plane direction of the touch panel module 111 is applied to a first structure 110, it is possible to naturally return the first structure 110 to an appropriate position by a repulsive force of the cushion member 150.

Figure 13:
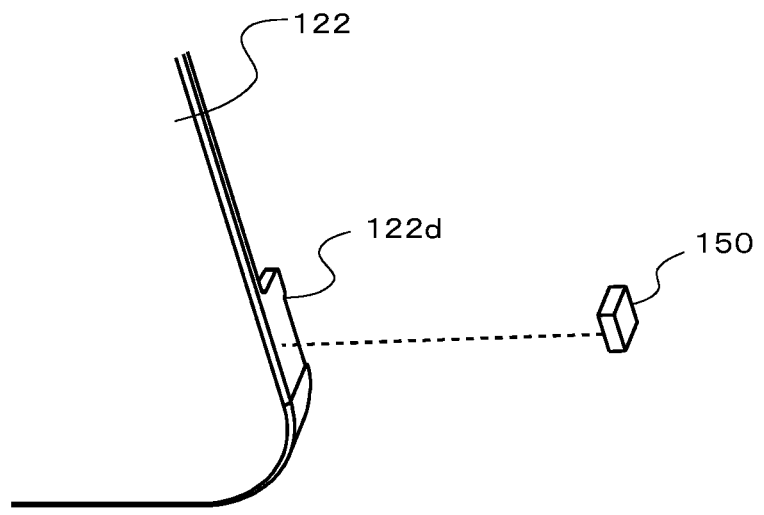
FIG. 13 is a partial perspective view showing a second case of an operation device according to a third modification of the present disclosure.
Figure 14:
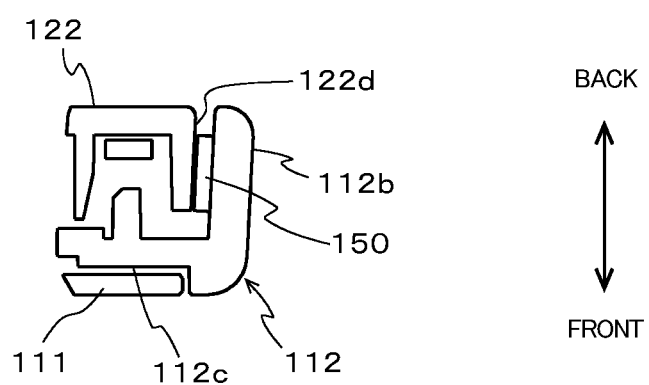
FIG. 14 is a partial cross-sectional view of the above-described operation device.

FIG. 13 is a partial perspective view showing the second case 122 of the operation device 100 according to the present modification, and shows a portion corresponding to an area E in FIG. 5 of the above-described embodiment. FIG. 14 is a partial cross-sectional view of the operation device 100 according to the present modification, and shows a portion corresponding to the cross section taken along the line B-B in FIG. 3 of the above-described embodiment. In FIG. 14, a hatching indicating a cross section is omitted to make it easy to see the drawing.

A mounting piece 122d extending substantially perpendicular (including exactly perpendicular) to the plane direction of the touch panel module 111 is provided on a side surface of the second case 122, and the cushion member 150 is attached to the mounting piece 122d by an adhesive or the like. Thus, the cushion member 150 is provided between the mounting piece 122d of the second case 122, and a peripheral wall portion 112b of the first case 112. At this occasion, the cushion member 150 is compressed against the plane direction of the touch panel module 111. It is desirable that the cushion member 150 is in contact with both the mounting piece 122d and the peripheral wall portion 112b, or is slightly compressed by both. The cushion member 150 can be optionally selected, as long as the cushion member 150 has a structure and/or a material that is compressible and has an appropriate repulsive force against compression. However, it is desirable to avoid a cushion member having an excessively large repulsive force or surface resistance. This is for the purpose of preventing generation of vibrations by the linear vibration actuator 10 from being obstructed. For a similar reason to the above, it is also desirable to avoid designing such that a cushion member is excessively compressed in an installed state. Further, the mounting piece 122d and the cushion member 150 may be optionally provided on a plurality of side surfaces of the second case 122. When the operation device 100 is installed in a multifunction device 200 in a state that an operation surface of the touch panel module 111 is aligned with a vertical direction, the mounting piece 122d and the cushion member 150 may be provided on side surfaces located on the upper side and/or the left and right sides except for a side surface located on the lower side in an installed state. This is because when an external force is applied to the first structure 110 from the lower side to the upper side in an installed state, the first structure 110 naturally returns to an appropriate position by the load applied to the touch panel module 111 even if the position of the first structure 110 is displaced.

[Fourth Modification]

A fourth modification of the present disclosure is described with reference to FIGS. 15 and 16. An operation device 100 according to the present modification may include a conductive sheet 160 that comes into contact with a first supporting body 113 and a second supporting body 121, and the conductive sheet 160 may have a bent portion 161 bent in the thickness direction of the operation device 100. According to this configuration, it is possible to suppress a decrease in the vibration amount of a first structure 110, and secure electrical conduction between the first supporting body 113 and the second supporting body 121.

Figure 15:
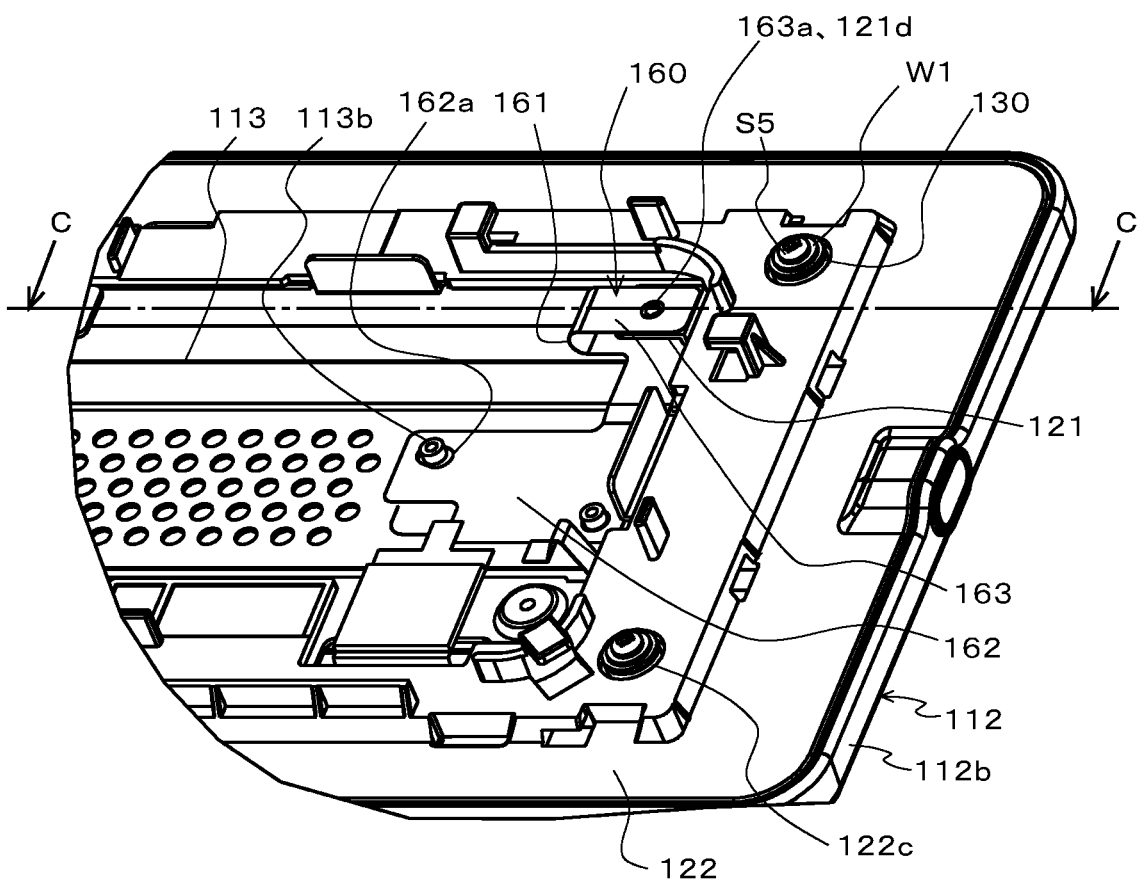
FIG. 15 is a partial perspective view of an operation device according to a fourth modification of the present disclosure.
Figure 16:
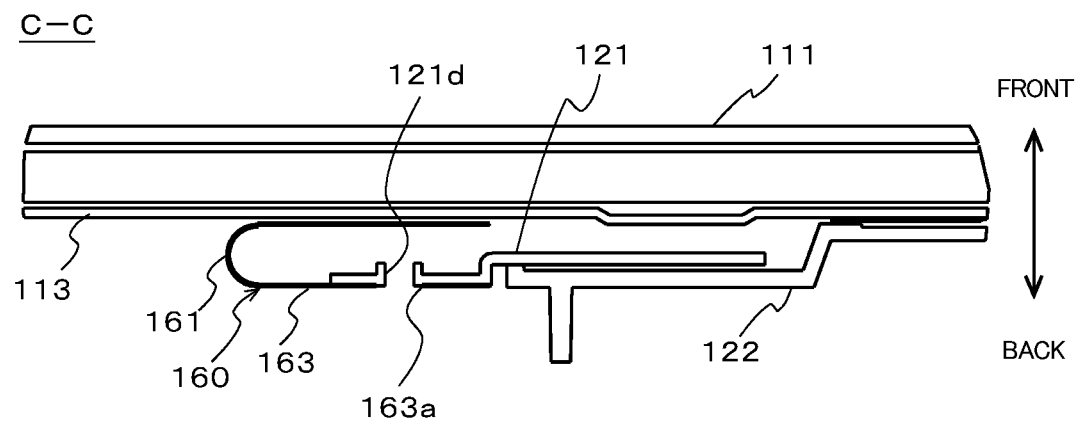
FIG. 16 is a cross-sectional view taken along the line C-C in FIG. 15.

FIG. 15 is a partial perspective view of the operation device 100 according to the present modification when viewed from the back side, and shows a portion corresponding to an approximately right half of FIG. 3 in the above-described embodiment. FIG. 15 shows a state in which a linear vibration actuator 10, a circuit board 123, and a third supporting body 124 are removed from the operation device 100, and mainly shows a layout of the conductive sheet 160. FIG. 16 is a cross-sectional view taken along the line C-C in FIG. 15. In FIG. 16, a hatching indicating a cross section is omitted to make it easy to see the drawing.

The conductive sheet 160 is one example of a conductive member according to the present disclosure, and is a conductive sheet-like member, for example, made of a composite material in which aluminum (Al) foil and a polyester film are bonded together. The conductive sheet 160 has bendable flexibility. The conductive sheet 160 has a shape such that the alphabet "U" is rotated approximately by 90 [°] counterclockwise, and is disposed in such a way that a lower piece 162 comes into contact with a portion of the first supporting body 113 where the linear vibration actuator 10 is disposed, and an upper piece 163 comes into contact with a peripheral portion of a screw hole 121d of the second supporting body 121. The lower piece 162 is formed with a through-hole 162a associated with a screw hole 113b of the first supporting body 113. The upper piece 163 is formed with a through-hole 163a associated with the screw hole 121d of the second supporting body 121. The lower piece 162 of the conductive sheet 160 is fixed to the first supporting body 113 by a screw S2 via the linear vibration actuator 10, and the upper piece 163 is fixed to the second supporting body 121 by a screw S4 via the circuit board 123 and the third supporting body 124. In fixing, the upper piece 163 is bent in the thickness direction of the operation device 100 (from the back side to the front side), and the bent portion 161 is formed on the conductive sheet 160. The bent portion 161 functions as a play portion that does not restrict minute positional displacement of the first structure 110 accompanied by vibrations, and is capable of suppressing a decrease in the vibration amount of the first structure 110, while securing conduction between the first supporting body 113 and the second supporting body 121 as measures against static electricity and radiation noise.

[Fifth Modification]

A fifth modification of the present disclosure is described with reference to FIGS. 17 to 20. In an operation device 100A according to the present modification, a damper rubber 130 may be disposed on a first supporting body 113 to be compressed by the load applied to a touch panel module 111 when the operation device 100A is installed in a multifunction device 200. According to this configuration, it is possible to accurately exhibit the vibration damping performance of the damper rubber 130 without reducing the vibration damping performance.

Figure 17:
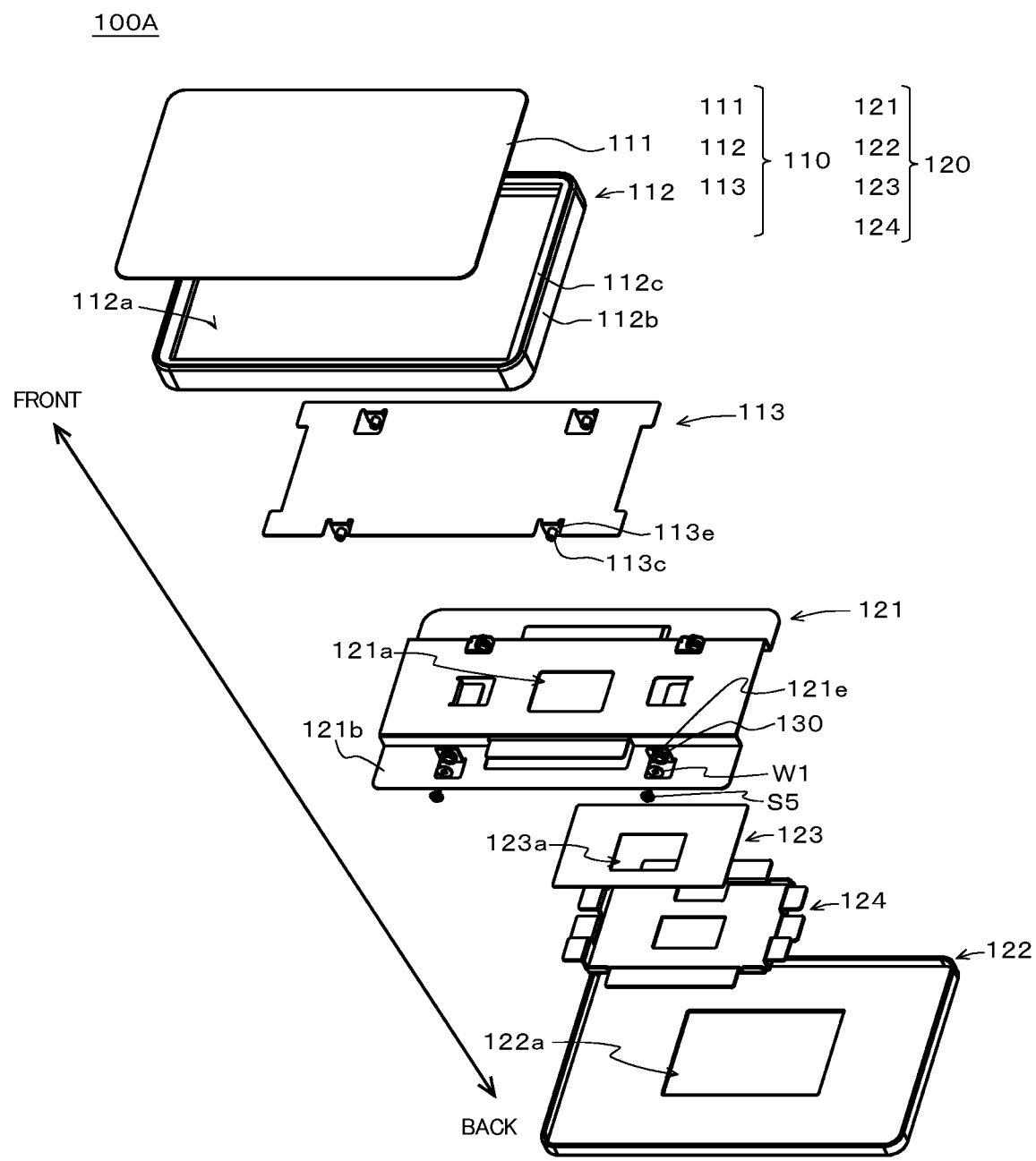
FIG. 17 is an exploded perspective view of an operation device according to a fifth modification of the present disclosure.
Figure 18:
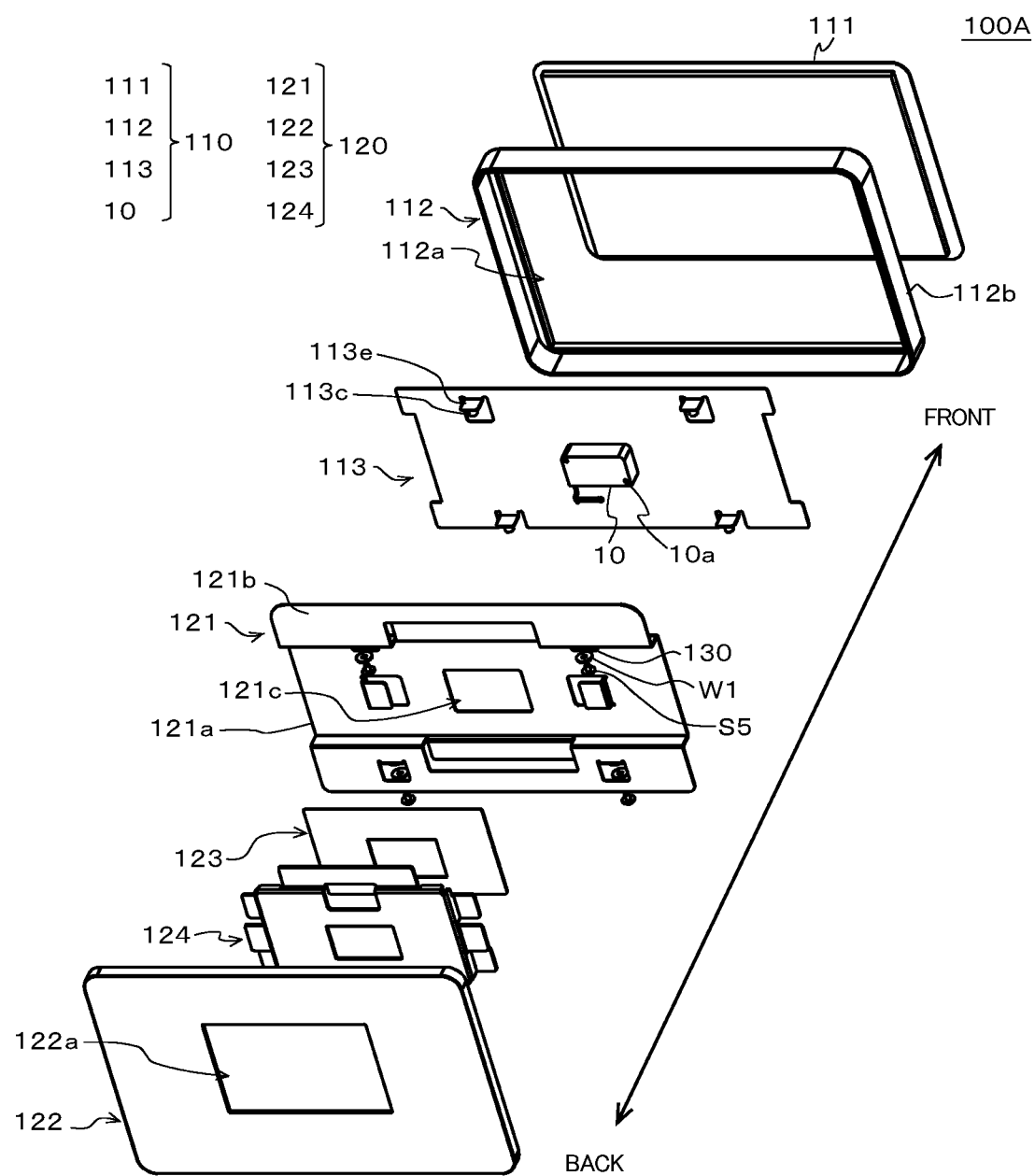
FIG. 18 is an exploded perspective view of the above-described operation device.
Figure 19:
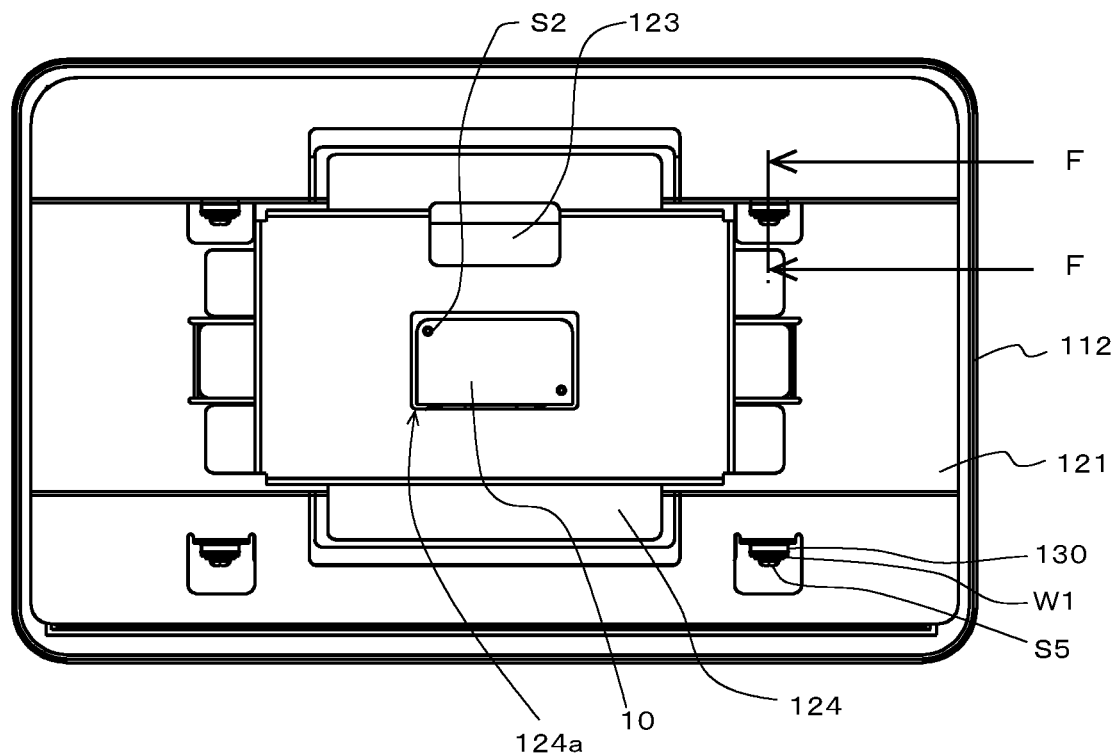
FIG. 19 is a rear view in a state that a second case is removed from the above-described operation device.
Figure 20:
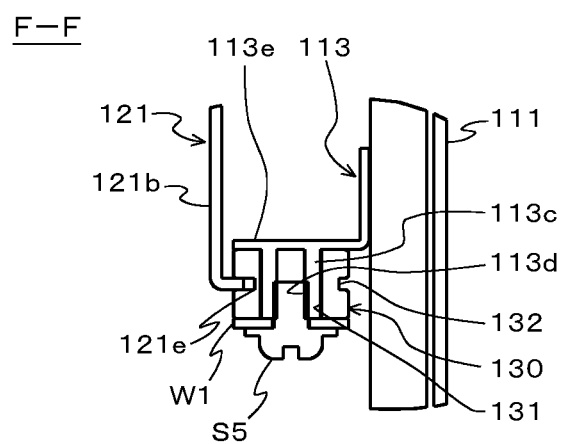
FIG. 20 is a cross-sectional view taken along the line F-F in FIG. 19.

FIG. 17 is an exploded perspective view of the operation device 100A according to the present modification when viewed from the front side, and corresponds to FIG. 4 of the above-described embodiment. FIG. 18 is an exploded perspective view of the operation device 100A according to the present modification when viewed from the back side, and corresponds to FIG. 5 of the above-described embodiment. FIG. 19 is a rear view showing a state that a second case 122 is removed from the operation device 100A according to the present modification. FIG. 20 is a cross-sectional view taken along the line F-F in FIG. 19. In the operation device 100A according to the present modification, shapes and the like of a first supporting body 113, a second supporting body 121, and other members are changed as necessary with respect to the above-described embodiment in carrying out the above-described features. Further, in FIGS. 17 to 19, some of screw holes, through-holes, and screws for fixing each member are omitted as necessary.

The operation device 100A according to the present modification is installed in the multifunction device 200 in a state that an operation surface of the touch panel module 111 is aligned with a vertical direction. Specifically, the load direction applied to the touch panel module 111 is approximately aligned with the operation surface. On the other hand, the damper rubber 130 is disposed on the first supporting body 113 in such a way that the compression direction thereof substantially coincides with (including a case where the compression direction exactly coincides with) the load direction applied to the touch panel module 111. Specifically, the first supporting body 113 includes a plurality of (four in the present modification) rectangular mounting pieces 113e, each of which is formed by cutting out the first supporting body 113 substantially perpendicular (including exactly perpendicular) to the operation surface of the touch panel module 111, and a cylindrical portion 113c extending from the mounting piece 113e along the operation surface of the touch panel module 111. A hole portion of the cylindrical portion 113c serves as a screw hole 113d. Further, a cutout portion 121e associated with a groove portion 132 of the damper rubber 130 is formed in the second supporting body 121 in a direction substantially perpendicular (including exactly perpendicular) to the operation surface of the touch panel module 111. Some of the cutout portions 121e located on the upper side in FIGS. 17 to 19 are formed by cutting out a connecting portion between a base portion 121a of the second supporting body 121 and an upper long plate portion 121b, and a portion substantially perpendicular (including exactly perpendicular) to the operation surface of the touch panel module 111. Some of the cutout portions 121e located on the lower side in FIGS. 17 to 19 are formed by cutting out a part of a lower long plate portion 121b of the second supporting body 121, and further cutting out the cutout portion. In disposing the damper rubber 130, first, the groove portion 132 of the damper rubber 130 is fitted into the cutout portion 121e of the second supporting body 121, and then, the cylindrical portion 113c of the first supporting body 113 is inserted into a through-hole 131 of the damper rubber 130. Then, a screw S5 is tightened into the screw hole 113d of the cylindrical portion 113c via a washer W1. The damper rubber 130 disposed in this way is compressed by the load applied to the touch panel module 111 when the operation device 100 is installed in the multifunction device 200. Therefore, it is possible to accurately exhibit the vibration damping performance of the damper rubber 130 without reducing the vibration damping performance.

Although the operation device according to the present disclosure has been described as an example in the configurations of the above-described embodiment and modifications, the present disclosure is not limited to the above. It is needless to say that various improvements and changes are also available in other configurations, as far as the improvements and the changes do not deviate from the gist of the present disclosure. For example, the operation device according to the present disclosure may be configured by combining the above-described plurality of modifications.

For example, operation target equipment of the operation device according to the present disclosure may be not only a multifunction device but also an air conditioner, a water heater, audio equipment, and the like.

DESCRIPTION OF REFERENCE NUMERALS

100 Operation device
10 Linear vibration actuator (Vibration actuator)
20 Touch panel
30 Display panel
110 First structure
111 Touch panel module
112 First case
113 First supporting body
120 Second structure
121 Second supporting body
122 Second case
123 Circuit board
124 Third supporting body
130 Damper rubber (Vibration damping member)
140 Resin spacer (non-vibration damping member)
150 Cushion member
160 Conductive sheet (conductive member)

The invention claimed is:

1. An operation device for operating operation target equipment, the operation device comprising:
a first structure including a touch panel module having a touch panel that detects an operation position of an operator and a display panel, a first case in which the touch panel module is disposed, a first supporting body to which the first case is fixed, and a vibration actuator disposed on the first supporting body;
a second structure including a second supporting body to be connected to the first supporting body, a second case to be fixed to the second supporting body, and a circuit board disposed in the second supporting body or the second case;
a vibration damping member that connects the first supporting body and the second supporting body;
a fixing member that fixes the vibration damping member to the first supporting body; and
a non-circular washer provided between the vibration damping member and the fixing member,
wherein a part of an outer edge portion of the washer overlaps a back surface of the second case at a distance.

2. The operation device according to claim 1, wherein the first case is a frame body surrounding a peripheral edge of the touch panel module.

3. The operation device according to claim 1, wherein the first supporting body has a higher rigidity than the first case.

4. The operation device according to claim 1, further comprising
a non-vibration damping member that connects the first supporting body and the second supporting body, in place of the vibration damping member.

5. The operation device according to claim 1, further comprising a cushion member located between the first case and the second case along a plane direction of the touch panel module.

6. The operation device according to claim 1, further comprising a conductive member that comes into contact with the first supporting body and the second supporting body,
wherein the conductive member has a bent portion bent in a thickness direction of the operation device.

7. The operation device according to claim 1, wherein the vibration damping member is disposed on the first supporting body to be compressed by a load applied to the touch panel module when the operation device is installed in the operation target equipment.

8. An operation device for operating operation target equipment, the operation device comprising:
a first structure including a touch panel module having a touch panel that detects an operation position of an operator and a display panel, a first case in which the touch panel module is disposed, a first supporting body to which the first case is fixed, and a vibration actuator disposed on the first supporting body;
a second structure including a second supporting body to be connected to the first supporting body, a second case to be fixed to the second supporting body, and a circuit board disposed in the second supporting body or the second case; and
a vibration damping member that connects the first supporting body and the second supporting body,
wherein the first supporting body includes cylindrical portions, the cylindrical portions being respectively formed at a plurality of positions on a back surface of the first supporting body,
wherein the second supporting body includes a rectangular base portion and cutout portions, the cutout portions being respectively formed at a plurality of positions in an outer peripheral portion of the rectangular base portion,
wherein the vibration damping member is cylindrical, and has a through-hole inside and a groove portion in an outer surface,
wherein one of the cylindrical portions of the first supporting body is inserted into the through-hole of the vibration damping member, and
wherein one of the cutout portions of the second supporting body is fitted into the groove portion of the vibration damping member.

9. The operation device according to claim 8, wherein the first case is a frame body surrounding a peripheral edge of the touch panel module.

10. The operation device according to claim 8, wherein the first supporting body has a higher rigidity than the first case.

11. The operation device according to claim 8, further comprising a non-vibration damping member that connects the first supporting body and the second supporting body, in place of the vibration damping member.

12. The operation device according to claim 8, further comprising:
a fixing member that fixes the vibration damping member to the first supporting body; and
a non-circular washer provided between the vibration damping member and the fixing member,
wherein a part of an outer edge portion of the washer overlaps a back surface of the second case at a distance.

13. The operation device according to claim 8, further comprising a cushion member located between the first case and the second case along a plane direction of the touch panel module.

14. The operation device according to claim 8, further comprising a conductive member that comes into contact with the first supporting body and the second supporting body,
   wherein the conductive member has a bent portion bent in a thickness direction of the operation device.

15. The operation device according to claim 8,
   wherein the vibration damping member is disposed on the first supporting body to be compressed by a load applied to the touch panel module when the operation device is installed in the operation target equipment, and
   wherein the touch panel module is installed with a vertical direction in the operation target equipment.

* * * * *